Figure 7:
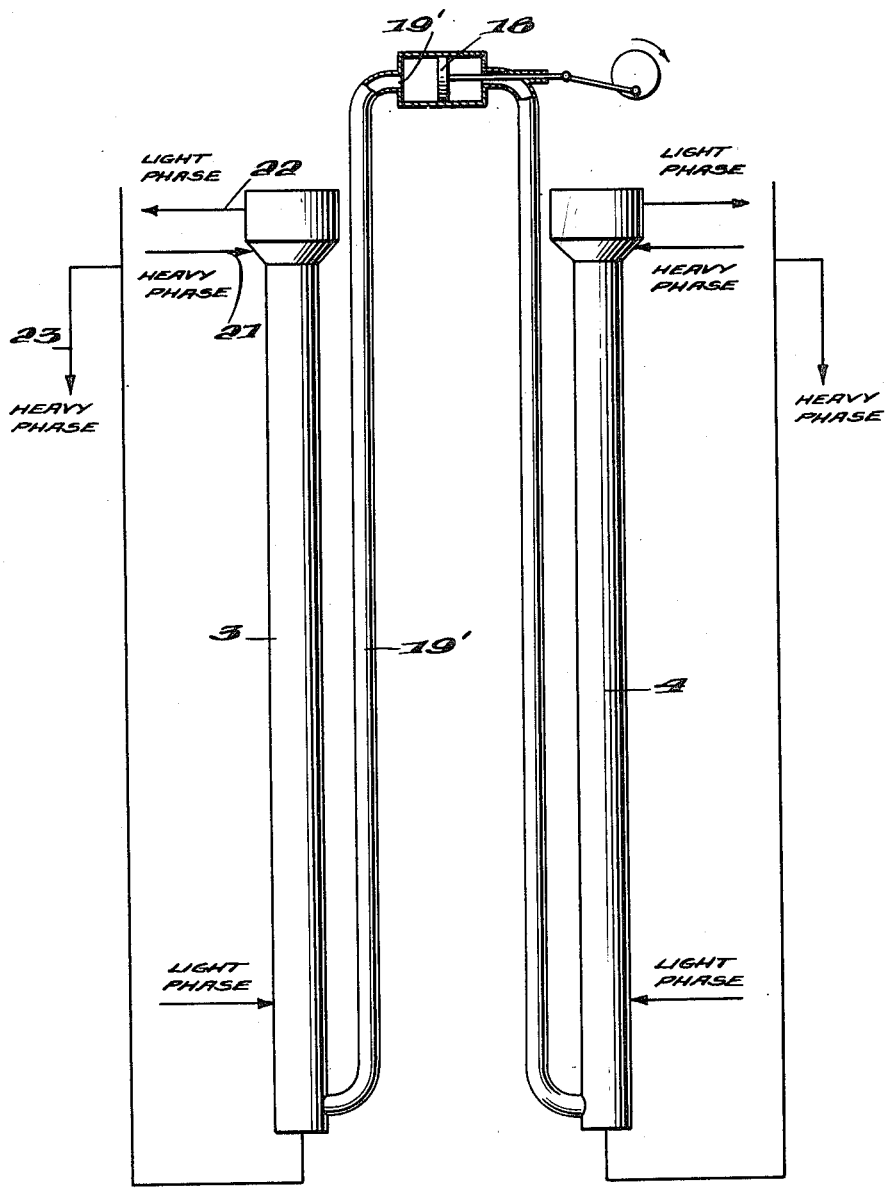

March 23, 1965 G. KÄBISCH ETAL 3,174,831
PULSATING COLUMN APPARATUS
Filed Jan. 3, 1961 3 Sheets-Sheet 1
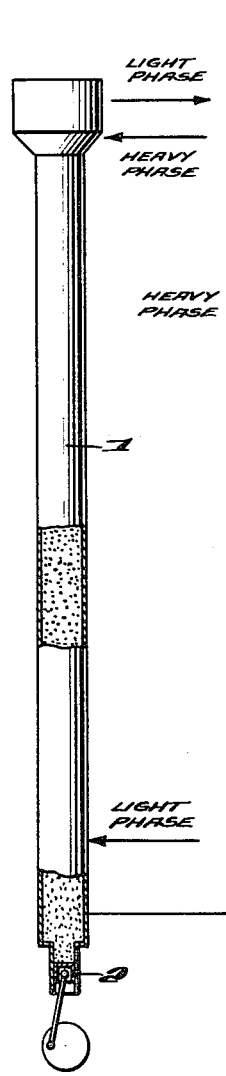
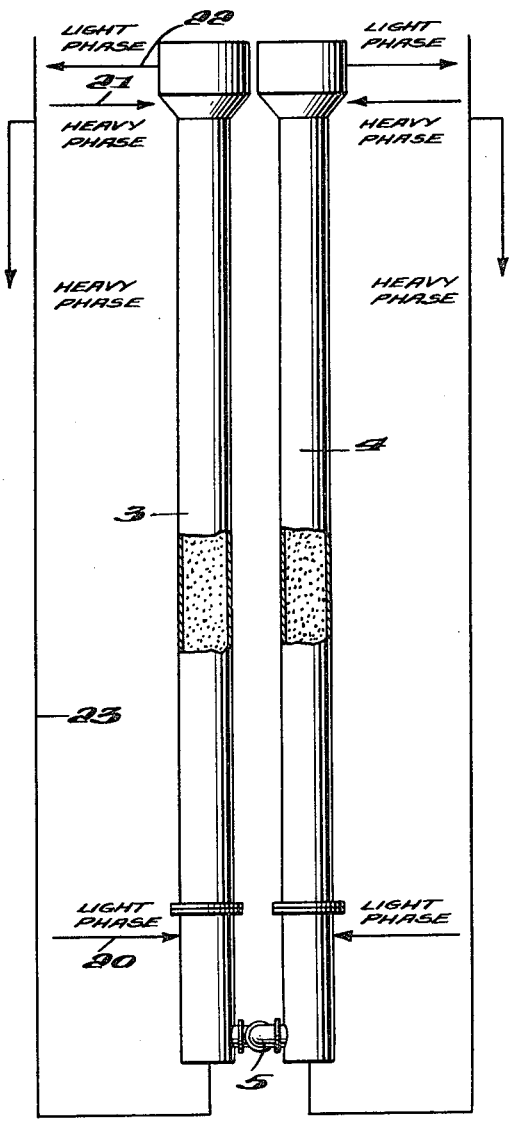
INVENTORS
GERHARD KÄBISCH,
HEINRICH SAUER,
ATTORNEYS

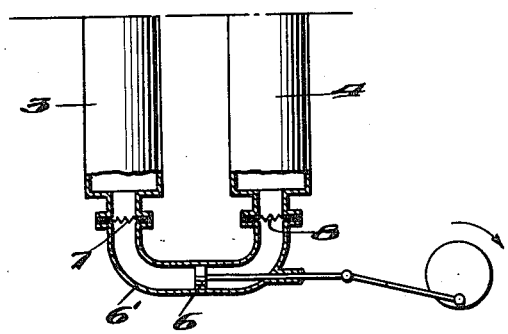
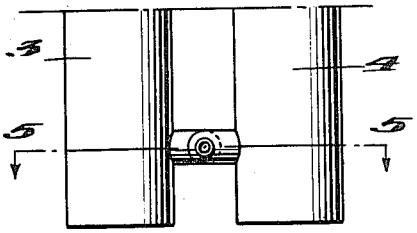
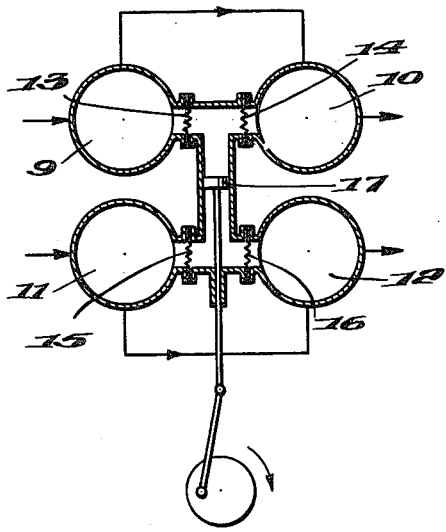
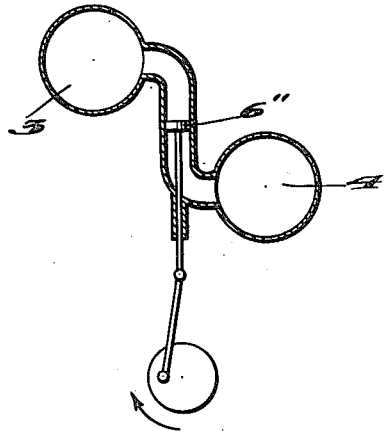

United States Patent Office 3,174,831
Patented Mar. 23, 1965

3,174,831
PULSATING COLUMN APPARATUS
Gerhard Käbisch and Heinrich Sauer, Rheinfelden, Germany, assignors to Deutsche Gold- und Silber-Scheideanstalt vormals Roessler, Frankfurt am Main, Germany
Filed Jan. 3, 1961, Ser. No. 80,257
4 Claims. (Cl. 23—270.5)

The invention relates to an apparatus for producing an interchange between fluid and fluid or fluid and gaseous phases. More particularly it relates to an apparatus operating to produce such an interchange according to the countercurrent principle.

Various devices in the forms of columns have been developed for carrying out such a procedure. These include pulsating columns, the York-Scheibel column and the rotating disc contactor, which have provided improved operation. Especially noticeable has been the development in the field of pulsating columns, because these have found a wide use.

The basic principle of pulsating columns is disclosed in Patent No. 2,011,186, to Van Dijcks. This procedure consists in producing vibrations in the fluid by means of an agitator, such as a membrane pump, a bellows pump, a piston pump or the like, serving to produce a turbulence which improves the extraction. The H.E.T.S. value (H.E.T.S. means the height of a theoretical stage) of a pulsating column is generally only about 10% to 40% of that of a non-pulsating column, which, with a corresponding throughput for the two columns, leads to a smaller volume, a smaller time required for the passage of materials through the columns, and a smaller construction for the pulsating column.

Pulsating columns can easily be enlarged by laboratory techniques to half-technical size, by increasing the cross-section and correspondingly the throughput. For example, if the throughput in an NW 50 laboratory column (cross-section equals 19.6 cm.$^2$) is 40 liters per hour, and the cross-section is increased 10 times, a column is produced with a cross-section of 196 cm.$^2$. Previous attempts to adapt the pulsating columns also to the solution of large quantity extraction procedures have failed because of mechanical difficulties. These include the enlargement of the necessary vibration producing agitator or the very great power requirements of the agitator, so that Grob (Fortschritte der Verfahrenstechnik, 1956/57, page 344, Verlag Chemie 1958) states "that the pulsating columns must remain restricted to small throughputs."

The primary object of the present invention is to provide an apparatus which overcomes the disadvantages of the prior art devices.

Primarily, it is the object of the invention to provide an apparatus with which large scale extraction procedures can be carried out by pulsating columns in a simple manner, while maintaining the power requirement comparatively small. The apparatus of the invention is applicable to all types of pulsating columns (for example, pulsating columns with perforated bottoms, packed tower pulsating columns, pulsating spray columns and the like) and can be applied not only to extraction between liquids and liquids, but also for extraction between gaseous and liquid systems.

The principle of the invention lies in carrying out the extraction in two or several apparatus, the vibration producing devices of which are coupled together. Columns are especially well suited for carrying out the extraction.

The coupling of the vibration producing devices brings many mechanical advantages. For example, a single driving mechanism for the vibration pumps can be applied to as many columns as desired. Likewise, certain difficulties in sealing are avoided. There is, furthermore, a substantial reduction in the power requirement of the driving system, which is of considerable importance.

Further objects and advantages of the invention will appear more fully from the following description, particularly when taken in conjunction with the accompanying drawings which form a part thereof.

In the drawings:
FIG. 1 shows a conventional pulsating column;
FIG. 2 shows diagrammatically the principle of an apparatus embodying the invention;
FIG. 3 shows, partly in cross-section, a portion of an apparatus embodying the invention;
FIG. 4 shows in side elevation the bottom of another apparatus embodying the invention;
FIG. 5 is a cross-section on the line 5—5 of FIG. 4;
FIG. 6 shows in cross-section and diagrammatically still another modification; and
FIG. 7 shows a further modification.

FIG. 1 shows a known type of NW 190 packed tower column. Assuming that this column is to be modified so as to produce an output 100 times as great, it must be made with a diameter of 1900 mm. In this column, which is indicated by 1, the vibration is produced by a piston pump 2 fitting in the bottom of the column. In an NW 190 column, the diameter of the piston is 80 mm. and it is provided with means for adjusting the stroke and frequency. In the enlarged column, the pump for producing the vibrations would require a piston of 800 mm. diameter, which is extremely difficult to produce without having great trouble with the packing. Bellows pumps or membrane pumps are simply not constructed in such large dimensions. Also, the necessary driving mechanism will require entirely too much power, so that the use of such a column for extraction is impractical.

In the device according to FIG. 2, there are two columns 3 and 4 connected at the bottom, and in the connection between the bottom sections is a vibration producing pump indicated at 5, not shown in detail in this figure. In order to increase the throughput to 100 times that of an NW 190 column, each of the columns 3 and 4 must have a diameter of 1340 mm. Assuming that the pump 5 is a piston pump, it would require a diameter of about 500 mm., which could however be reduced to about 200 mm. by increasing the length of stroke, in order to maintain equal amplitude of vibrations in the columns.

This construction has a number of advantages. One of these is that the piston need not be packed tightly (for example, an unpacked piston, that is, one without piston rings), since the fluids on both sides of the piston are at substantially the same pressure and since no harm is done if a little leakage past the piston occurs. The absence of any requirement for a tight fit of the piston reduces the friction and thereby produces a saving in the energy required for producing the vibrations. Primarily, however, it will be noted that the equal pressures on each side of the piston, because of the substantially equal height of the fluid in the two columns, means that there is not nearly as much energy necessary to produce the vibrations.

In the form of FIG. 2, the light phase is introduced at 20 and the heavy phase at 21. The light phase comes off at 22 and the heavy phase at 23.

If two separate extractions are to be carried out at the same time, this can be accomplished in the manner shown in FIG. 3. In this figure, columns 3 and 4 are connected at the bottom by connection 6', in which operates the pump piston 6. The connection is closed off from the two columns by movable sealing members, such as bellows or pleated diaphragms 7, 8. These separate the two columns from each other without requiring any substantial packing of the piston of the pump, the only necessary tight seal being at the point where the piston rod passes out of the connection.

An advantage of this construction is that the membranes need withstand only the pressure produced by the power pumping device, since there are equal pressures on both sides, so that the danger of leakage is considerably reduced.

It would also be possible to vibrate the membranes themselves directly in such a device.

In the form of FIGS. 4 and 5, where the same fluids are being treated in both columns, the piston 6 of the pump is merely arranged in the connection 6" in the bottom part of columns 3 and 4.

A greater number of columns can also be operated by a single pump. For example, as shown in FIG. 6, columns 9, 10, 11 and 12 are all joined by a common connection in which the piston 17 of the pump operates, being separated from this connection by diaphragms 13, 14, 15 and 16. In this case, columns 9 and 10 as well as columns 11 and 12 might be successive columns of a series of columns, with for example, the light phase entering at the bottom of column 9, coming out at the top and passing to the bottom of column 10 and then out from the top of column 10, while the heavy phase would enter at the top of column 10, go out from the bottom to the top of column 9 and go out from the bottom of column 9.

As used herein, and in the claims, the term "fluid" is intended to include both liquids and gases.

In the treatment of corrosive fluids, the construction shown in FIG. 7 may also be used. Here the columns 3 and 4 are connected by upwardly extending pipes 19, 19 running from the bottom portions of the column upwardly to a pump cylinder 19', in which is located the piston 18 of a pump. The pump cylinder 19' is located above the tops of the columns 3 and 4. Vibration is imparted to the material in the columns by a gas contained in the pipes 19', which may for instance be an inert gas. Such a structure, however, does involve certain energy losses in the compression of the gas as compared with the other devices.

It will be noted that the connection between the bottoms of the columns in which the vibration producing device operates is independent of the fluid conducting means for the columns, that is the connections by which the light and heavy phases are introduced into and are removed from the columns.

While we have described herein some embodiments of our invention, we wish it to be understood that we do not intend to limit ourselves thereby except within the scope of the claims hereto or hereinafter appended.

We claim:

1. Apparatus for countercurrent extraction between fluids, comprising at least two columns, a connection between the lower parts of the columns, and vibration producing means located in such connection and operative to produce vibrations simultaneously in opposite directions in both columns, the vibration producing means including an unpacked piston and means to move the piston longitudinally back and forth through the connection, the connection having throughout a cross-section at least substantially equal to the cross-section of the piston.

2. Apparatus as claimed in claim 1, in which said columns have fluid conducting means and said connection is independent of the fluid conducting means.

3. Apparatus as claimed in claim 2, in which said conducting means connect at least two columns in series.

4. In apparatus as claimed in claim 1, diaphragm means closing off said connection from said columns whereby separate processes can be carried out in the two columns.

References Cited by the Examiner

UNITED STATES PATENTS

| | | | |
|---|---|---|---|
| 2,090,496 | 8/37 | Wynn. | |
| 2,808,318 | 10/57 | Feick | 23—270.5 |
| 2,818,324 | 12/57 | Thornton | 23—270.5 |

OTHER REFERENCES

Jealous et al.: "The Concatenated Pulse Column" (Chem. Engng. Progress, September 1956, pp. 366–370 inclusive).

NORMAN YUDKOFF, *Primary Examiner.*

GEORGE D. MITCHELL, LEO QUACKENBUSH,
*Examiners.*